United States Patent [19]

Best et al.

[11] Patent Number: 4,735,928

[45] Date of Patent: Apr. 5, 1988

[54] HYDROCRACKING CATALYST

[75] Inventors: Donald F. Best, Mahopac; Gary N. Long, Putnam Valley; Regis J. Pellet, Croton-On-Hudson; Jule A. Rabo, Armonk; Edward T. Wolynic, Scarsdale, all of N.Y.

[73] Assignee: Union Carbide Corporation, Danbury, Conn.

[21] Appl. No.: 764,618

[22] Filed: Aug. 12, 1985

Related U.S. Application Data

[63] Continuation of Ser. No. 490,951, May 2, 1983, abandoned.

[51] Int. Cl.$^4$ .............................................. B01J 29/28
[52] U.S. Cl. ........................................ 502/65; 502/66; 502/73; 502/74
[58] Field of Search ..................... 502/65, 66, 73, 74

[56] References Cited

U.S. PATENT DOCUMENTS

| | | | |
|---|---|---|---|
| 3,140,253 | 7/1964 | Plank et al. | 208/120 |
| 3,926,780 | 12/1975 | Ward | 208/111 |
| 3,929,620 | 12/1975 | Parthasarathy et al. | 208/111 |
| 3,933,983 | 1/1976 | Elliott, Jr. | 423/328 |
| 4,419,271 | 12/1983 | Ward | 502/65 |
| 4,429,053 | 1/1984 | Ward | 502/65 |
| 4,503,023 | 3/1985 | Breck et al. | 423/328 |
| 4,517,073 | 5/1985 | Ward et al. | 208/111 |
| 4,563,434 | 1/1986 | Ward et al. | 502/66 |
| 4,565,621 | 1/1986 | Ward | 208/111 |

FOREIGN PATENT DOCUMENTS 172578  2/1986  European Pat. Off. .

Primary Examiner—Carl F. Dees
Attorney, Agent, or Firm—Vincent J. Vasta, Jr.

[57] ABSTRACT

Process for hydrocracking a crude oil feed, hydrocracking catalyst employed therein and the process for its preparation. The instant invention employs new aluminosilicate zeolite catalysts derived from a new zeolites denominated "LZ-210" which provide hydrocracking catalysts which demonstrate improved activity in first and/or second stage operation.

58 Claims, No Drawings

HYDROCRACKING CATALYST

This application is a continuation of application Ser. No. 490,951 filed May 2, 1983, now abandoned.

FIELD OF THE INVENTION

The present invention relates to a hydrocracking catalyst its preparation and to its process of use in hydrocracking processes.

BACKGROUND OF THE INVENTION

Hydrocracking catalysts and processes for their use are well known in the prior art. The literature on such catalysts and processes is quite extensive. Certain technical areas have been addressed as of particular interest as is readily apparent based on the large numbers of patents on certain technical topics, e.g., the use of certain zeolites as cracking catalysts. Representatives of the patents in this area are the ZSM patents which include: U.S. Pat. No. 3,894,934 (ZSM-5); U.S. Pat. No. 3,871,993 (ZSM-5, ZSM-11, ZSM-12 and ZSM-21); U.S. Pat. No. 3,702,886 (ZSM-5); and U.S. Pat. No. 3,758,403 (ZSM-5 in combination with zeolite Y) of and U.S. Pat. No. 3,972,983 (ZSM-20).

Although the aforementioned patents on the use of ZSM-type zeolites in hydrocracking catalysts are of interest, the use of these zeolites has not been of significant commercial interest to date. The commercially significant activity in the hydrocracking area has been for the most part directed to further elaboration on the basic hydrocracking technology which has arisen in relation to zeolite Y, as disclosed in U.S. Pat. No. 3,130,007.

The development of hydrocracking catalysts based on a Y-type zeolite has taken many directions. Illustrative of the various processes which have arisen are those disclosed in the following patents:

U.S. Pat. No. 3,293,192 discloses a "synthetic ultra stable zeolitic aluminosilicate: of the Y-type (see: U.S. Pat. No. 3,594,331 which discloses that Z-14HS is zeolite Y) which has been prepared by calcining a low alkali metal Y zeolite and successively base exchanging the calcined product with a base solution containing ammonium or complex amino salts until the alkali content is less than 1 weight percent and then calcining this product.

U.S. Pat. No. 3,493,519 discloses a process for calcining an ammonium-Y zeolite in the presence of rapidly-flowing steam followed by base exchange and treatment of the product with a chelating agent capable of combining with aluminum whereby aluminum is extracted from zeolite Y.

U.S. Pat. No. 3,506,400 discloses an improved process for extracting aluminum from a zeolite similar to that disclosed in U.S. Pat. No. 3,493,519. The improvements is to employ mineral acids in the aluminum extraction process.

U.S. Pat. No. 3,513,108 discloses a process for improving the hydrothermal stability of aluminosilicates by subjecting the hydrogen form of the aluminosilicate to calcination in an inert atmosphere with the resulting water, generated as a result of the calcination, being allowed to react with the resultant crystalline aluminosilicate.

U.S. Pat. No. 3,594,331 discloses a process for treating a crystalline aluminosilicate by treating the zeolite with a soluble fluoride salt. The process is disclosed to be a stabilization process wherein fluoride becomes associated with structural $Na_2O$.

U.S. Pat. No. 3,640,681 discloses a process for extracting aluminum from the framework of a crystalline zeolitic molecular sieve by use of acetylacetone and a metal acetylacetonate as extractants.

U.S. Pat. No. 3,691,099 discloses a process for extracting aluminum from a crystalline zeolitic aluminosilicate by use of an acidic solution containing at least one water soluble salt which reacts with aluminum atoms of the zeolite.

U.S. Pat. No. 3,933,983 discloses a process similar to the process of U.S. Pat. No. 3,594,331 except that a cation exchange step is added after the fluoride treatment step.

U.S. Pat. No. 4,093,560 discloses a process for dealuminizing, i.e, extracting aluminum therefrom by treatment with an acidic slurry of an ammonium or alkali metal salt which upon acidification complexes aluminum. The aluminum removal process destroys at least a portion of the crystallinity of the support material.

U.S. Pat. No. 4,242,237 discloses a catalyst comprising a mixture of a Y-type zeolite and a small pore zeolite, e.g. zeolite A.

The above patents are illustrative of the state of the hydrocracking art. Although there has been extensive development of Y-type hydrocracking catalysts there has been little development of truly new hydrocracking catalysts. This paradox, the lack of new catalytic materials despite the sizable economic interest, is readily understood by an appreciation of the fact that the work horse of the commercial hydrocracking business is zeolite Y. As a result, the patent literature discloses the clear preference towards improving zeolite Y.

The existence of zeolite Y and its use as a catalyst for hydrocracking processes is now well accepted if not, in fact, legendary. Still, the state of the art relating to zeolite Y and its use in hydrocracking catalysts has been generally limited to ion-exchange techniques, aluminum extraction techniques and other secondary treatment processes which tend to remove aluminum from zeolite Y. Such aluminum deficient products necessarily contain significant levels of defect structure (hereinafter defined) as a result of the extraction of aluminum and as a result should have the common deficiencies observed in such materials, including reduced chemical and thermal stabilities which ultimately result in reduced catalyst life. What is missing in the prior art is a new form of zeolite Y wherein zeolite Y, has in fact been modified in a way other than by only extracting aluminum to lower the aluminum content with the resulting increase in the concentration of defects in the crystal structure. Such a composition would be unique in its structure and in its utility as a hydrocracking catalyst.

One such method for producing such a material is disclosed in U.S. Ser. No. 315,853 filed Oct. 28, 1981, commonly assigned, wherein zeolite Y (as well as may other zeolites) may be contacted with a fluorosilicate salt in an amount of at least 0.0075 moles per 100 grams of the zeolite Y (on an anhydrous basis) and where said fluorosilicate salt is provided in the form of an aqueous solution having a ph value within the range of 3 to about 7. The aqueous solution of the fluorosilicate salt is brought into contact with zeolite Y at a rate sufficiently slow to preserve at least 80 percent, preferably at least 90 percent of the crystallinity of the starting zeolite Y and silicon atoms, as $SiO_4$ tetrahedra, are inserted into the crystal lattice in substitution for aluminum atoms. The final material is truly the first material known to have been prepared wherein the molar ratio of SiO₂ to Al₂O₃ was changed by a concurrent aluminum extraction and SiO₂ insertion. The uniqueness of this product is readily apparent from a consideration of the fact that in over seventeen (17) year since the publication of zeolite Y that only the materials of U.S. Ser. No. 315,853 have been prepared to have SiO₂/Al₂O₃ ratios greater than 6 while not containing the significant defect structure which is necessarily associated with any process which extracts aluminum from the framework.*

*There has been one report (G.B. No. 1,431,944) of the preparation of a faujasite-type structure (Zeolite 529) having a high silica to alumina ratio. The patent alleges that a direct synthesis process prepared a faujasite zeolite having a silica to alumina ratio between 5.5 to 8.0 (see claim 11). Unfortunately, the patentees failed to prepare such materials and reported silica to alumina ratios based on measurements employing dehydrated samples. Apparently, the patentees did not appreciate the fact that during the preparation of Zeolite 529 that the heating step at 110° C. or greater dehydrated the prepared materials which resulted in an erroneously low $a_o$ and, therefore, an erroneously high $SiO_2/Al_2O_3$ ratio based on the $a_o$. The net result appears to be simple, i.e., Zeolite 529 is simply a form of zeolite Y.

SUMMARY OF THE INVENTION

The present invention relates to hydrocracking catalysts and to hydrocracking processes employing such catalysts. The hydrocracking catalyst comprises a zeolitic aluminosilicate which has a mole ratio of oxides expressed in the anhydrous state of

$(0.85-1.1)M_{2/n}O:Al_2O_3:XSiO_2$ wherein M is a cation having a valence of "n" and "x" has a value greater than 6.0 and less than 9.0, has an X-ray powder diffraction pattern having at least the d-spacings of Table A, has extraneous silicon atoms in the crystal lattice in the form of framework SiO₄ tetrahedra and has been treated at an effective temperature, preferably in the presence of steam, and for an effective duration of time to provide the improved hydrocracking catalyst(s).

DETAILED DESCRIPTION OF THE INVENTION

The present invention relates to the hydrocarbon conversion process generally known as hydrocracking. Hydrocracking is a process for converting high boiling hydrocarbon feedstocks to lower boiling products by cracking the high boiling hydrocarbon feedstock and hydrogenating the unsaturates in the product.

Such processes are well known in the art (see: *Zeolite Chemistry and Catalysis*, by Jule A. Rabo, ACS Monograph 171, Chapter 13 (1976)) and are known to be of several general types. Two well known types include the single-stage type and the two-stage type. In the single-stage type (Unicracking-J.H.C. or Jersey Hydrocracking) process the feedstocks are pretreated to remove essentially all sulfur and nitrogen, e.g., by a hydrotreater, whereby desulfurization and denitrification are effected. The hydrocarbon stream is then hydrocracked in a reactor in the presence of a catalyst at a single pass conversion of between 40 and 70 percent. Any unconverted hydrocarbon may be recycled to extinction following scrubbing for ammonia removal and fractionation for separation of converted products. The two-stage process (Unicracking-JHC) has been developed which provides a second stage that employs the effluent from the single-stage type hydrocracking process (after passage through an ammonia scrubber) and from a second hydrocracking reactor as the input feed for a fractionation unit. The unconverted feedstock is then recycled to extinction in the second hydrocracking reactor. Because the catalyst in the second hydrocracking reactor operates in an essentially ammonia-free environment the rate of conversion in this reactor can be maintained at a higher level, e.g. 60 to 80 percent and typically is carried out at a lower temperature than the first-stage reactor.

The catalysts of the present invention will be referred to herein, solely for the purpose of reference herein, as (1) LZ-210-T and (2) LZ-210-M to denominate, respectively, (1) an LZ-210 zeolite which has been subjected to a thermal treatment (as hereinafter defined), and (2) an LZ-210 zeolite which has been subjected to a treatment with a multivalent cation and, optionally, a thermal treatment. Other components and treatments may be employed to provide the final catalytic cracking catalysts and exemplary of such will be discussed hereinafter.

The present invention relates to hydrocracking processes and to new hydrocracking catalysts and their use where the hydrocracking catalyst is formed with a zeolitic aluminosilicate (referred to hereinafter as LZ-210) having a mole ratio of oxides expressed in the anhydrous state of:

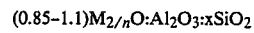
$(0.85-1.1)M_{2/n}O:Al_2O_3:xSiO_2$ wherein M is a cation having a valence of "n" and "x" has a value greater than 6.0 and less than 9.0, has an X-ray powder diffraction pattern having at least the d-spacings of Table A, has extraneous silicon atoms in the crystal lattice in the form of framework SiO₄ tetrahedra and has been treated at an effective temperature and for an effective duration of time to provide a hydrocracking catalyst.

It has been found that by treating the zeolitic aluminosilicates above described for an effective time and at an effective temperature that superior hydrocracking catalysts are obtained. Surprisingly, it has been found that when the SiO₂ to Al₂O₃ ratio of LZ-210-T is equal to or greater than 9.0 that the use of LZ-210-T as a hydrocracking catalyst rapidly falls off in its hydrocracking performance. Although the reasons for this markedly different performance are not known at present it is clear that the silica to alumina range of between greater than 6.0 and equal to or less than 9.0 is critical in the development of hydrocracking catalysts based upon LZ-210-T and LZ-210-M, as hereinafter discussed.

The aluminosilicates referred to herein as LZ-210, from which LZ-210-T and LZ-210-M are derived, are generally disclosed in copending U.S. Ser. No. 315,853, filed Oct. 28, 1981, incorporated herein by reference thereto, as zeolites prepared by a novel fluorosilicate treatment process.

LZ-210-T and LZ-210-M are derived from aluminosilicates having in the dehydrated state, a chemical composition expressed in terms of mole ratios of oxides as

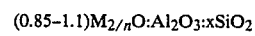
$(0.85-1.1)M_{2/n}O:Al_2O_3:xSiO_2$ wherein "M" is a cation having the valence "n" and "x" is a value greater than 6 and less than or equal to 9.0, having an X-ray powder diffraction pattern having at least the d-spacings set forth in Table A, below, and having extraneous silicon atoms in its crystal lattice in the form of SiO₄ tetrahedra, preferably in an average amount of at least 1.0 per 10,000 Å³.

For purposes of simplifying the description of certain subclasses of LZ-210 the framework composition may be expressed in terms of mole fractions of framework tetrahedra TO₂. The starting zeolite may be expressed as:

$$(Al_aSi_b\square_z)O_2$$

wheras "a" is the mole fraction of aluminum tetrahedra in the framework; "b" in the mole fraction of silicon tetrahedra in the framework; □ denotes defect sites and "z" is the mole fraction of defect sites in the zeolite framework. In many cases the "z" value for the starting zeolite is zero and the defect sites are simply eliminated from the expression. Numerically the sum of the values $a+b+z=1$.

The zeolite product of the fluorosilicate treatment, expressed in terms of mole fraction of framework tetrahedra (TO₂) will have the form $$[Al_{(a-N)}Si_{b+(N-\Delta z)}\square_z]O_2$$

wherein: "N" is defined as the mole fraction of aluminum tetrahedra removed from the framework during the treatment: "a" is the mole fraction of aluminum tetrahedra present in the framework of the starting zeolite; "b" is the mole fraction of silicon tetrahedra present in the framework of the starting zeolite; "z" is the mole fraction of defect sites in the framework; $(N-\Delta z)$ is the mole fraction increase in silicon tetrahedra resulting from the fluorosilicate treatment; "Δz" is the net change in the mole fraction of defect sites in the zeolite framework resulting from the treatment $\Delta z = z$ (product zeolite) $-z$ (starting zeolite) The term "Defect Structure Factor" for any given zeolite is equivalent to the "z" value of the zeolite. The net change in Defect Structure Factors between the starting zeolite and the product zeolite is equivalent to "Δz". Numerically, the sum of the values:

$$(a-N)+[b+(N-\Delta z)]+z=1$$

A subclass of the above LZ-210 compositions, i.e. those which are characterized by having both high molar SiO₂/Al₂O₃ ratios and low Defect Structure Factors (as hereinafter discussed), can be defined as having a chemical composition expressed in terms of mole fractions of framework tetrahedra as:

$$[Al_{(a-N)}Si_{b+(N-\Delta z)}\square_z]O_2$$

wherein: the mole fraction of aluminum (−N) removed from the framework of the starting zeolite is at least 0.03a;

$$\frac{b + (N - \Delta z)}{a - N}$$

has a value greater than 3.0 and less than or equal to 4.5 preferably greater than 3.0 and less than 4.0; the change in defect structure factor Δz is less than 0.08 and preferably less than 0.05; an increased silicon content in the framework, $$\frac{(N - \Delta z)}{N},$$

of at least 0.5; and a cation equivalent expressed as a monovalent cation species, M⁺/Al, from 0.85 to 1.1 and the characteristic crystal structure of zeolite Y as indicated by an X-ray powder diffraction pattern having at least the d-spacings set forth broadly in Table A.

TABLE A

| d(Å) | Intensity |
|---|---|
| 14.3–14.10 | very strong |
| 8.71–8.66 | medium |
| 7.43–7.38 | medium |
| 5.66–5.61 | strong |
| 4.75–4.71 | medium |
| 4.36–4.33 | medium |
| 3.76–3.73 | strong |
| 3.30–3.27 | strong |
| 2.85–2.82 | strong |

Zeolite LZ-210, as defined above will have cubic unit cell dimension, $a_o$, of less than 24.65 Angstroms and, an adsorption capacity for water vapor at 25° C. and 4.6 Torr water vapor pressure of at least 20 weight percent based on the anhydrous weight of the zeolite, and preferably an oxygen adsorption capacity at 100 Torr and −183° C. of at least 25 weight percent.

LZ-210 can be prepared by a method which removes framework aluminum from a zeolite having SiO₂/Al₂O₃ molar ratios of about 3 or greater and substituting therefor silicon from a source extraneous to the starting zeolite. By such a procedure it is possible to create more highly siliceous zeolite species which have the same crystal structure as would result by direct synthesis if such synthesis method were known. The process disclosed in copending U.S. Ser. No. 315,853 comprises contacting a crystalline zeolite having a pore diameter of at least about 3 Angstroms and having a molar SiO₂/Al₂O₃ ratio of at least 3, with a fluorosilicate salt, preferably in an amount of at least 0.0075 moles per 100 grams of zeolite starting material, said fluorosilicate salt being in the form of an aqueous solution having a pH value in the range of 3 to about 7, preferably 5 to about 7, and brought into contact with the zeolite either incrementally or continuously at a slow rate whereby framework aluminum atoms of the zeolite are removed and replaced by extraneous silicon atoms from the added fluorosilicate.

LZ-210 can be prepared from a conventionally prepared zeolite Y which has a molar SiO₂/Al₂O₃ ratio of less than the SiO₂/Al₂O₃ of the final LZ-210 product employed herein by using the above process to increase the SiO₂/Al₂O₃ ratio to greater than 6.0 and less than 9.0. A preferred procedure comprises:

(a) providing a zeolite Y composition having a molar SiO₂/Al₂O₃ ratio less than that of the final LZ-210 product;

(b) contacting and reacting at a temperature of from 20° C. to 95° C. said zeolite Y with a fluorosilicate, preferably ammonium fluorosilicate.

The fluorosilicate solution in the form of an aqueous solution in the range of about 5 to 7 is brought into contact with the zeolite either incrementally or continuously at a slow rate such that a sufficient proportion of the framework aluminum atoms removed are replaced by silicon atoms to retain at least 80 percent, preferably at least 90 percent, of the crystal structure of the starting zeolite Y; and (c) isolating the zeolite having an enhanced framework silicon content from the reaction mixture.

The starting zeolite Y composition can be synthesized by any of the processes well known in the art. A representative process is disclosed in U.S. Pat. No. 3,130,007.

For reasons more fully explained hereinafter, it is necessary that the starting zeolite be able to withstand the initial loss of framework aluminum atoms to at least a modest degree without collapse of the crystal structure unless the process is to be carried out at a very slow pace. Accordingly, it is preferred that the $SiO_2/Al_2O_3$ ratio in the initial Y zeolite starting material be at least about 3.0. Also it is preferred that at least about 50%, and more preferably at least 95%, of the $AlO_4^-$ tetrahedra of the naturally occurring or as-synthesized zeolite are present in the starting zeolite, i.e., the starting zeolite advantageously contains as many as possible of its original $AlO_4^-$ tetrahedra or has not been subjected to any post-formation treatment which either extensively removes aluminum atoms from their original framework sites or converts them from the normal conditions of 4-fold coordination with oxygen.

The cation population of the starting zeolite is not a critical factor insofar as substitution of silicon for framework aluminum is concerned, but since the substitution mechanism involves the in situ formation of salts of at least some of the zeolitic cations, it is advantageous that these salts be water-soluble to a substantial degree to facilitate their removal from the silica-enriched zeolite product. It is found that ammonium cations formed the most soluble salt in this regard and it is accordingly preferred that at least 50 percent, most preferably 85 or more percent, of the zeolite cations be ammonium cations. Sodium and potassium, two of the most common original cations in zeolites are found to form $Na_3AlF_6$ and $K_3AlF_6$ respectively, both of which are only very sparingly soluble in either hot or cold water. When these compounds are formed as precipitates within the structural cavities of the zeolite they are quite difficult to remove by water washing. Their removal, moreover, is important if thermal stability of the zeolite product is desired since the substantial amounts of fluoride can cause crystal collapse at temperatures as low as 500° C.

The fluorosilicate salt used as the aluminum extractant and also as the source of extraneous silicon which is inserted into the zeolite structure in place of the extracted aluminum can be any of the fluorosilicate salts having the general formula $(A)_{2/b}SiF_6$ wherein A is preferably a metallic or non-metallic cation other than H+ having the valence "b". Cations represented by "A" are alkylammonium, $NH_4^+$, $H^+$, $Mg^{++}$, $Li^+$, $Na^+$, $K^+$, $Ba^{++}$, $Cd^{++}$, $Cu^+$, $Cu^{++}$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$ and $Zn^{++}$. The ammonium cation form of the fluorosilicate is highly preferred because of its substantial solubility in water and also because the ammonium cations form water soluble by-product salts upon reaction with the zeolite, namely $(NH_4)_3AlF_6$.

In certain respects, the manner in which the fluorosilicate and starting zeolite are brought into contact and the overall process of substituting silicon for aluminum in the zeolite framework is a two step process in which the aluminum extraction step will, unless controlled, proceed very rapidly while the silicon insertion is relatively very slow. If dealumination becomes too extensive without silicon substitution, the crystal structure becomes seriously degraded and ultimately collapses. While we do not wish to be bound by any particular theory, it appears that the fluoride ion is the agent for the extraction of framework aluminum in accordance with the equation

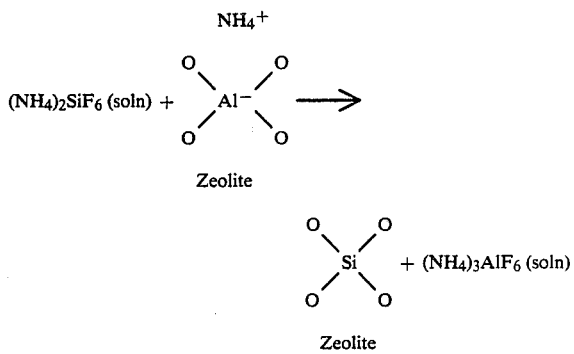

It is, therefore, essential that the initial dealumination step be inhibited and the silicon insertion step be promoted to achieve the desired zeolite product. It is found that the various zeolite species have varying degrees of resistance toward degradation as a consequence of framework aluminum extraction without silicon substitution. In general the rate of aluminum extraction is decreased as the pH of the fluorosilicate solution in contact with the zeolite is increased within the range of 3 to 7, and as the concentration of the fluorosilicate in the reaction system is decreased. Also increasing the reaction temperature tends to increase the rate of silicon substitution. Whether it is necessary or desirable to buffer the reaction system or strictly limit the fluorosilicate concentration is readily determined for each zeolite species by routine observation.

Theoretically, there is no lower limit for the concentration of fluorosilicate salt in the aqueous solution employed, provided of course the pH of the solution is high enough to avoid undue destructive acidic attack on the zeolite structure apart from the intended reaction with the fluorosilicate. Very slow rates of addition of fluorosilicate salts insure that adequate time is permitted for the insertion of silicon as a framework substitute for extracted aluminum before excessive aluminum extraction occurs with consequent collapse of the crystal structure. Practical commercial considerations, however, require that the reaction proceed as rapidly as possible, and accordingly the conditions of reaction temperature and reagent concentrations should be optimized with respect to each zeolite starting material. In general the more highly siliceous the zeolite, the higher the permissible reaction temperature and the lower the suitable pH conditions. In general the preferred reaction temperature is within the range of 50° to 95° C., but temperatures as high as 125° C. and as low as 20° C. have been suitably employed in some instances. At pH values below about 3 crystal degradation is generally found to be unduly severe, whereas at pH values higher than 7, silicon insertion is unduly slow. The maximum concentration of fluorosilicate salt in the aqueous solution employed is, of course, interdependent with the temperature and pH factors and also with the time of contact between the zeolite and the solution and the relative proportions of zeolite and fluorosilicate. Accordingly it is possible that solutions having fluorosilicate concentrations of from about $10^{-3}$ moles per liter of solution up to saturation can be employed, but it is preferred that concentrations in the range of 0.5 to 1.0 moles per liter of solution be used. These concentration values are with respect to true solutions, and are not intended to apply to the total fluorosilicate in slurries of salts in water. As illustrated hereinafter, even very slightly soluble fluorosilicates can be slurried in water and used as a reagent—the undissolved solids being readily available to replace dissolved molecular species consumed in reaction with the zeolite. As stated hereinabove, the amount of dissolved fluorosilicates employed with respect to the particular zeolite being treated will depend to some extent upon the physical and chemical properties of the individual zeolites as well as other specifications herein contained in this application. However, the minimum value for the amount of fluorosilicate to be added should be at least equivalent to the minimum mole fraction of aluminum to be removed from the zeolite.

In this disclosure, including the appended claims, in specifying proportions of zeolite starting material or adsorption properties of the zeolite product, and the like, the "anhydrous state" of the zeolite will be intended unless otherwise stated. The term "anhydrous state" is employed herein to refer to a material considered to be obtained by heating the zeolite in dry air at 100° C. for 1 to 2 hours.

It is apparent from the foregoing that, with respect to reaction conditions, it is desirable that the integrity of the zeolite crystal structure is substantially maintained throughout the process, and that in addition to having extraneous (non-zeolitic) silicon atoms inserted into the lattice, the zeolite retains at least 80 and preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak heights, in terms of arbitrary units above background, of the starting material is used as the standard and is compared with the corresponding peak heights of the products. When, for example, the numerical sum of the peak heights of the product is 85 percent of the value of the sum of the peak heights of the starting zeolite, then 85 percent of the crystallinity has been retained. In practice it is common to utilize only a portion of the d-spacing peaks for this purpose, as for example, five of the six strongest d-spacings. In zeolite Y these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T). J. Am. Chem. Soc. 60 309 (1938) using nitrogen as the adsorbate. In determining the adsorption capacity, the capacity for oxygen at $-183°$ C. at 100 Torr is preferred.

All available evidence, to date, indicates that the above described process is unique in being able to produce zeolites essentially free of defect structure yet having molar $SiO_2/Al_2O_3$ ratios higher than those heretofore obtained by direct hydrothermal synthesis i.e., no other process is known to date for preparing LZ-210. The products resulting from the operation of the process share the common characteristic of having a higher molar $SiO_2/Al_2O_3$ ratio than previously obtained for each species by direct hydrothermal synthesis by virtue of containing silicon from an extraneous, i.e. non-zeolitic, source, preferably in conjunction with a crystal structure which is characterized as containing a low level of tetrahedral defect sites. This defect structure, if present, is revealed by the infrared spectrum of zeolites in the hydroxyl-stretching region.

In untreated, i.e. naturally occurring or as-synthesized zeolites the original tetrahedral structure is conventionally represented as

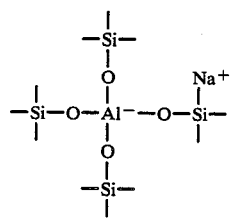

After treatment with a complexing agent such as ethylene-diaminetetraacetic acid ($H_4EDTA$) in which a stoichiometric reaction occurs whereby framework aluminum atoms along with an associated cation such as sodium is removed as NaAlEDTA, it is postulated that the tetrahedral aluminum is replaced by four protons which form a hydroxyl "nest", as follows:

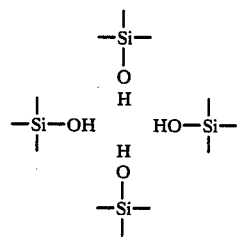

The infrared spectrum of the aluminum depleted zeolite will show a broad nondescript adsorption band beginning at about 3750 cm$^{-1}$ and extending to about 3000 cm$^{-1}$. The size of this absorption band or envelope increases with increasing aluminum depletion of the zeolite. The reason that the absorption band is so broad and without any specific absorption frequency is that the hydroxyl groups in the vacant sites in the framework are coordinated in such a way that they interact with each other (hydrogen bonding). The hydroxyl groups of adsorbed water molecules are also hydrogen-bonded and produce a similar broad absorption band as do the "nest" hydroxyls. Also, certain other zeolitic hydroxyl groups, exhibiting specific characteristic absorption frequencies within the range of interest, will if present, cause infrared absorption bands in these regions which are superimposed on the band attributable to the "nest" hydroxyl groups. These specific hydroxyls are created by the decomposition of ammonium cations or organic cations present in the zeolite.

It is, however, possible to treat zeolites, prior to subjecting them to infrared analysis, to avoid the presence of the interferring hydroxyl groups and thus be able to observe the absorption attributable to the "nest" hydroxyls only. The hydroxyls belonging to adsorbed water are avoided by subjecting the hydrated zeolite sample to vacuum activation at a moderate temperature of about 200° C. for about 1 hour. This treatment permits desorption and removal of the adsorbed water. Complete removal of adsorbed water can be ascertained by noting when the infrared absorption band at about 1640 cm$^{-1}$, the bending frequency of water molecules, has been removed from the spectrum.

The decomposable ammonium cations can be removed, at least in large part, by ion-exchange and replaced with metal cations, preferably by subjecting the ammonium form of the zeolite to a mild ion exchange treatment with an aqueous NaCl solution. The OH absorption bands produced by the thermal decomposition of ammonium cations are thereby avoided. Accordingly the absorption band over the range of 3745 cm$^{-1}$ to about 3000 cm$^{-1}$ for a zeolite so treated is almost entirely attributable to hydroxyl groups associated with defect structure and the absolute absorbance of this band can be a measure of the degree of aluminum depletion.

It is found, however, that the ion-exchange treatment, which must necessarily be exhaustive even though mild, required considerable time. Also the combination of the ion-exchange and the vacuum calcination to remove adsorbed water does not remove every possible hydroxyl other than defect hydroxyls which can exhibit absorption in the 3745 cm$^{-1}$ to 3000 cm$^{-1}$ range. For instance, a rather sharp band at 3745 cm$^{-1}$ has been attributed to the Si-OH groups situated in the terminal lattice positions of the zeolite crystals and to amorphous (non-zeolitic) silica from which physically adsorbed water has been removed. For these reasons we prefer to use a somewhat different criterion to measure the degree of defect structure in the zeolite products of this invention.

In the absence of hydrogen-bonded hydroxyl groups contributed by physically adsorbed water, the absorption frequency least affected by absorption due to hydroxyl groups other than those associated with framework vacancies or defect sites is at 3710±5 cm$^{-1}$. Thus the relative number of defect sites remaining in a zeolite product of this invention can be gauged by first removing any adsorbed water from the zeolite, determining the value of the absolute absorbance in its infrared spectrum at a frequency of 3710 cm$^{-1}$, and comparing that value with the corresponding value obtained from the spectrum of a zeolite having a known quantity of defect structure. The following specific procedure has been arbitrarily selected and used to measure the amount of defect structure in the products prepared in the Examples appearing hereinafter. Using the data obtained from this procedure it is possible, using simple mathematical calculation, to obtain a single and reproducible value hereinafter referred to as the "Defect Structure Factor", denoted hereinafter by the symbol "z", which can be used in comparing and distinguishing the present novel zeolite compositions from their less-siliceous prior known counter-parts and also with equally siliceous prior known counter-parts prepared by other techniques.

DEFECT STRUCTURE FACTOR FOR LZ-210

(A) Defect Structure Zeolite Standard.

Standards with known amounts of defect structure can be prepared by treating a crystalline zeolite of the same species as the product sample with ethylenediaminetetraacetic acid by the standard procedure of Kerr as described in U.S. Pat. No. 3,442,795. In order to prepare the standard it is important that the starting zeolite be well crystallized, substantially pure and free from defect structure. The first two of these properties are readily determined by conventional X-ray analysis and the third by infrared analysis using the procedure set forth in part (B) hereof. The product of the aluminum extraction should also be well crystallized and substantially free from impurities. The amount of aluminum depletion, i.e., the mole fraction of tetrahedral defect structure of the standard samples can be ascertained by conventional chemical analytical procedure. The molar $SiO_2/Al_2O_3$ ratio of the starting zeolite used to prepare the standard sample in any given case is not narrowly critical, but is preferably within about 10% of the molar $SiO_2/Al_2O_3$ ratio of the same zeolite species used as the starting material in the practice of the process of the present invention.

(B) Infrared Spectrum of Product Samples and Defect Structure Zeolite Standard.

Fifteen milligrams of the hydrated zeolite to be analyzed are pressed into a 13 mm. diameter self-supporting wafer in a KBr die under 5000 lbs. pressure. The wafer is then heated at 200° C. for 1 hour at a pressure of not greater than $1 \times 10^{-4}$ mm. Hg to remove all observable traces of physically adsorbed water from the zeolite. This condition of the zeolite is evidenced by the total absence of an infrared adsorption band at 1640 cm$^{-1}$. Thereafter, and without contact with adsorbable substances, particularly water vapor, the infrared spectrum of the wafer is obtained on an interferometer system at 4 cm$^{-1}$ resolution over the frequency range of 3745 to 3000 cm$^{-1}$. Both the product sample and the standard sample are analyzed using the same interferometer system to avoid discrepancies in the analysis due to different apparatus. The spectrum, normally obtained in the transmission mode of operation is mathematically converted to and plotted as wave number vs. absorbance.

(C) Determination of the Defect Structure Factor.

The defect structure factor (z) is calculated by substituting the appropriate data into the following formula:

$$z = \frac{AA_{(ps)} \times \text{(Mole fraction of defects in the standard)}}{AA_{(std)}}$$

wherein $AA_{(ps)}$ is the infrared absolute absorbance measured above the estimated background of the product sample at 3710 cm$^{-1}$; $AA_{(std)}$ is the absolute absorbance measured above the background of the standard at 3710 cm$^{-1}$ and the mole fraction of defects in the standard are determined in accordance with part (A) above.

Once the defect structure factor, z, is known, it is possible to determine from wet chemical analysis of the product sample for $SiO_2$, $Al_2O_3$ and the cation content as $M_{2/n}O$ whether silicon has been substituted for aluminum in the zeolite as a result of the treatment and also the efficiency of any such silicon substitution.

The fact that the present process results in zeolite products having silicon substituted for aluminum in the framework is substantiated by the framework infrared spectrum in addition to the hydroxyl region infrared spectrum. In the former, there is a shift to higher wave numbers of the indicative peaks and some sharpening thereof in the case of the present products, as compared to the starting zeolite, which is due to an increased $SiO_2/Al_2O_3$ molar ratio.

The essential X-ray powder diffraction patterns appearing in this specification and referred to in the appended claims are obtained using standard X-ray powder diffraction techniques. The radiation source is a high-intensity, copper target, x-ray tube operated at 50 Kv and 40 ma. The diffraction pattern from the copper K alpha radiation and graphite monochromator is suitably recorded by an X-ray spectrometer scintillation counter, pulse-height analyzer and strip-chart recorder. Flat compressed powder samples are scanned at 2° (2 theta) per minute, using a 2 second time constant. Interplanar spacings (d) are obtained from the position of the diffraction peaks expressed as 2 theta, where 2 theta is the Bragg angle as observed on the strip chart. Intensities are determined from the heights of diffraction peaks after subtracting background.

In determining the cation equivalency, i.e. the molar ratio $M_{2/n}O/Al_2O_3$, in each zeolite product, it is advantageous to perform the routine chemical analysis on a form of the zeolite in which "M" is a monovalent cation other than hydrogen. This avoids the uncertainty which can arise in the case of divalent or polyvalent metal zeolite cations as to whether the full valence of the cation is employed in balancing the net negative charge associated with each $AlO_4^-$ tetrahedron or whether some of the positive valence of the cation is used in bonding with $OH^-$ or $H_3O^+$ ions.

The preferred novel crystalline aluminosilicate compositions of the present invention will contain a chemical or molar framework composition which can be determined from the expression of mole fractions of framework tetrahedra previously described:

$$[Al_{(a-N)}Si_{b+(N-\Delta z)}\square_z]O_2$$

wherein: the framework Si/Al ratio is determined by

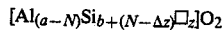

and is numerically greater than 3 and equal to or less than 4.5. The mole fraction of silicon tetrahedra substituted into the framework of the product zeolite $(N-\Delta z)$ is increased by at least a value for $$\frac{(N-\Delta z)}{N}$$

which is numerically greater than or equal to 0.5, the change in Defect Structure Factor $\Delta z$ is increased by less than 0.08 and preferably less than 0.05.

Moreover, regardless of the Defect Structure Factor of any zeolite material which has been treated according to the present process, it is novel by virtue of having had extraneous silicon inserted into its crystal lattice and having a molar $SiO_2/Al_2O_3$ ratio greater than heretofore obtained by direct hydrothermal synthesis. This is necessarily the case since all other methods for increasing the $SiO_2/Al_2O_3$ ratio of a zeolite crystal must remove framework aluminum atoms, and unless at least one of those removed aluminum atoms is replaced by a silicon atom from a source other than the crystal itself, the absolute defect structure content of the crystal must be greater than that of LZ-210.

CATALYSTS LZ-210-T AND LZ-210-M

The catalysts referred to herein as LZ-210-T and LZ-210-M were prepared from LZ-210 materials having a silica to alumina ratio of greater than 6 and less than or equal to 9 and preferably greater than 6.0 and less than 8.0. The preparation of LZ-210-T and LZ-210-M involve steps, respectively, of: (1) thermal and/or hydrothermal treatment; and (2) cation exchange with at least one multivalent cation. Other treatments may also be employed therewith. The various processing steps which may be employed to prepare LZ-210-T and/or LZ-210-M have been denominated herein, simply for convenient reference, by a shorthand notation where the following notations have the following general meanings:

A=LZ-210 has been exchanged with a multivalent cation;

B=hydrothermal treatment;

C=LZ-210 has been exchanged with ammonium cations; and

D=dry air calcination.

The above process notations, one or more, can be employed in a sequential manner to set forth the processing sequences employed for a given catalyst. For example, the designation "ABC" means that the LZ-210 material has been sequentially exchanged with a multivalent cation, hydrothermally treated and ammonium exchanged. Further, the use of the letters A and B only once in the sequence "ABC" may also be used to designate a process wherein the ion-exchange step A and C were carried out for more than one time while the sequence of step remains unchanged. For example step C may be effected by carrying out the ammonium exchange in one, two or more ion-exchanges with an ammonium salt.

The multivalent cation exchange is generally carried out by preparing a slurry of LZ-210 zeolite by adding about 5 to 15 volumes of water per volume of catalyst, after which a solution of a multivalent cation containing salt is added. The aforementioned step is generally carried out at room temperature and the resulting solution is then heated to above about 50° C. and stirred at this temperature for about 0.5 to 3 hours. This mixture is then filtered and water washed to remove excess anion present as a result of the solution of the rare earth salt.

The term "thermal treatment" is employed here to denominate a thermal calcination at an effective temperature and includes a thermal calcination in the presence of steam carried out at an effective temperature and time in the presence of an effective amount of steam to provide an LZ-210 based catalyst having improved catalyst life and improved selectivity to desired products as compared to the non thermally treated LZ-210. These improved catalysts are referred to herein as LZ-210-T and LZ-210-M. The hydrothermal treatment is typically carried out at effective process conditions comprising a temperature in excess of 300° C. for a period in excess of 0.5 hours in the presence of at least about 20 percent by volume steam in air. The term "air" is meant to cover equivalents such as nitrogen, argon, neon and the like as well as the gaseous mixture commonly referred to as air. The source of the steam is not important and may be provided from an external source or may be generated in situ at the temperatures employed for the thermal treatment.

The ammonium-exchange, when employed, is generally carried out by slurrying zeolite LZ-210 with between 5 to 15 volumes of water per volume of catalyst after which an ammonium salt is added to the slurry. The resulting mixture is typically heated to a temperature above about 50° C. for a period between about 0.5 to 3 hours. The mixture is filtered and water washed until excess anion from the ammonium salt is removed. The ammonium-exchange process is typically repeated one or more times as above discribed.

After the above process steps have been completed, i.e. the LZ-210-T or LZ-210-M products are prepared, the product is treated to provide a hydrogenation component therewith. As aforementioned the hydrogenation component may be added by most any method, such as ion exchange or impregnation and is preferably ion-exchange when noble metals are employed and preferably impregnation when base metals are employed as the hydrogenation component. When the hydrogenation component is provided by ion-exchange the LZ-210-T or LZ-210-M product is slurried in water. The noble metal complex solution is added in a conventional manner to effect ion exchange of the LZ-210-T and/or LZ-210-M.

The final LZ-210-T and LZ-210-M and associated hydrogenation components may be mixed with an inorganic matrix comprising alumina, silica-alumina, silica magnesia, silica-zirconia etc. The matrix may typically be employed in an amount between about 5 and about 95 percent by weight of the final product mixture. The exact amount of any matrix material employed with LZ-210-T and/or LZ-210-M will depend on many process factors and, accordingly, can vary. The matrix may be peptized or added as is to the LZ-210-T or LZ-210-M, and then agglomerated to the desired finished form. The finished catalyst particles are then typically dried in air, purged and calcined.

CATALYST LZ-210-T

The catalyst referred to herein as LZ-210-T is a catalyst derived from a class of LZ-210 catalysts which have improved use as hydrocracking catalysts. It has been found that by thermally treating (calcination or hydrothermal) a narrow class of LZ-210 aluminosilicates having a defined $SiO_2$ to $Al_2O_3$ (greater than 6.0 and less than or equal to 9.0 and preferably greater than 6.0 and less than 8.0) ratio that more active hydrocracking catalysts can be obtained than when the $SiO_2$ to $Al_2O_3$ ratio of said thermally heated LZ-210 is greater than 9.0.

CATALYST LZ-210-M

The silica to the alumina range of LZ-210 employed in forming LZ-210-T has use as a hydrocracking catalyst. Further, improvement over LZ-210 can be attained if in addition to thermal treatment of LZ-210, it is subjected to ion exchange with a multivalent cation selected from the group consisting of Groups IIA and IIIA and rare earth cations and is preferably a rare earth cation such as cerium, lanthanum, praseodymium, neodymium, promethium, samarium, europium, gadolinium, terbium, dysprosium, holmium, erbium, thulium, ytterbium lutetium and mixtures thereof. Such a catalyst is referred to herein as catalyst LZ-210-M. The rare earth component may be obtained as a commercially available mixture of rare earth chlorides or nitrates. Molycorp, Inc. offers a lanthanum-rare earth chloride (Product Code No. 5240) which contains about 46.0% by weight based on rare earth oxides with the rare earth component comprising 60.0% lanthanum ($La_2O_3$), 21.5% neodymium ($Nd_2O_3$), 10.0% cerium ($CeO_2$), 7.5% praseodymium ($Pr_6O_{11}$) and about 0.1% other rare earths. In addition, Molycorp, Inc. offers a lanthanum-rare earth nitrate (Product Code No. 5247) containing less than 1% Ce which contains a rare earth compound, expressed as the oxide, of 66.0% lanthanum ($La_2O_3$), 24.0% neodymium ($Nd_2O_3$), 0.7% cerium ($CeO_2$); 8.2% praseodymium ($Pr_6O_{11}$) and about 1.1% other rare earths.

The improved performance of a multivalent cation containing LZ-210 which is also thermally treated is surprising in view of the patent literature which discloses that ultrastable Y-type zeolites should be "substantially rare earth-free" when employed in hydrocracking catalysts (column 2, lines 52–64 of U.S. Pat. No. 4,242,237). Although the reasons are not clearly understood at present it is clear that the presence of such multivalent cations, particularly rare earth cations, with thermally treated LZ-210 provides for an improved performance of the product when employed as a hydrocracking catalyst as compared to LZ-210. In view of the catalytic differences between LZ-210-M and LZ-210, the aforementioned combination is viewed as a synergistic combination. It has been observed that improved catalysts can be prepared by carrying out the exchange of multivalent cations either prior to or after the thermal treatment, although the mechanism by which this enhancement in performance arises is not clearly understood at present owing in part to the uniqueness of the LZ-210 aluminosilicates.

As a result of the multivalent cation ion-exchange, LZ-210-M contains at least one multivalent cation, preferably at least one rare earth cation, in an effective amount to provide LZ-210-M catalysts with improved activity and LZ-210 starting material. The multivalent cation is typically present in an effective amount that removes at least about 2 ion exchange percent of the cations present in the starting LZ-210 material and is preferably present in an effective amount greater than about 5.0 ion exchange percent and is more preferably between about 16 ion exchange percent and about 80 ion exchange percent.

It has been observed that LZ-210-M has improved activity and catalyst life as compared to commercial catalysts based on zeolite Y and as compared with LZ-210. One of the most surprising features of the instant invention is the enhancement in chemical stability, hydrothermal stability and catalyst life of LZ-210-M as compared with LZ-210. Further, the level of enhancement observed in LZ-210-M based catalysts is not similarly observed in a rare earth exchanged zeolite Y when such is compared with a non-rare earth exchanged zeolite Y. The significant improvement in catalyst life is believed to derive from the unique nature of LZ-210-M resulting from the association of the rare earth cations with LZ-210. Although the exact nature of such association and the resultant significant improvement in catalyst life are not completely understood, the presence of such improvement in catalyst life is of commercial significance in hydrocracking processes.

Further, a particular advantage of LZ-210-M is the markedly improved rejuvenability of a spent form of the catalyst, i.e. the catalyst after use in a hydrocracking process. Representative rejuvenation processes employable herein are disclosed in U.S. Pat. Nos. 4,190,553, 4,107,031, 4,139,433, 4,268,376 and 4,055,483.

HYDROCRACKING CATALYST

The hydrocracking catalysts employing LZ-210-T or LZ-210-M will typically be employed in conjunction with a hydrogenation component of the type which are commonly employed in hydrocracking catalysts. The hydrogenation component is generally selected from the group of hydrogenation catalysts consisting of one or more metals of Group VI B and Group VIII, including the salts, complexes and solutions containing such. The preferred hydrogenation catalyst is selected from the groups of Group VIII metals, these salts and complexes thereof and is most preferably selected as a salt or complex of at least one noble metal of platinum, palladium, rhodium, iridium and mixtures thereof or at least one base metal of nickel, molybdenum, cobalt, tungsten, titanium, chromium and mixtures thereof. As recognized in the art, the noble and base metals will not generally be employed in the same catalyst system. The hydrogenation catalyst is present in an effective amount to provide the component hydrocracking catalyst and for noble metals is generally present in an amount between about 0.05% and about 1.5% by weight based on the total weight of the hydrocracking catalyst including the weight of any binder or matrix material which may be present, as hereinafter discussed, although effective amounts outside this range may be employed. Although effective amounts in excess of 1.5 percent by weight may be employed, the preferred effective amount of hydrogenation component is between about 0.3% and about 1.2% by weight. When the hydrogenation catalyst is a base metal(s) the effective amount will generally be between about 5% and about 30% percent by weight or more of the base metal oxide(s) based on the total weight of the hydrocracking catalyst.

Hydrocracking catalysts preprared from LZ-210 are prepared by providing a hydrogenation component with an LZ-210 which has been thermally treated and/or ion-exchanged with a multivalent cation. As above noted, the preferred preparation of LZ-210-T and LZ-210-M also involve one or more ammonium exchange steps.

The preferred process for the preparation of a hydrocracking catalyst based on LZ-210-T comprises treating a zeolitic aluminosilicate which has a mole ratio of oxides in the dehydrated state of $$(0.85-1.1)M_{2/n}O:Al_2O_3;xSiO_2$$

wherein M is a cation having a valence of "n"; "x" has a value greater than 6.0 and equal to or less than 9.0, preferably greater than 6.0 and less than 8.0, has an x-ray powder diffraction pattern having at least the d-spacings of Table A and has extraneous silicon atoms in the crystal lattice in the form of framework $SiO_4$ tetrahedra by the steps of:
(i) thermally treating the aluminosilicate at an effective temperature for an effective time;
(ii) treating the aluminosilicate with a solution of an ammonium salt; and
(iii) providing an effective amount at least one metal selected from the class consisting of Pt, Pd, Rh, Ru, Ni, W, Mo, Co, Ti, Cr to the product of steps (i) and (ii) to provide a hydrocracking catalyst; with the proviso that each of the steps (i) (ii) and (iii) may be carried out in any order for one or more times.
Similarly, the preferred process for the preparation of a hydrocracking catalyst based on LZ-210-M comprises treating a zeolitic aluminosilicate which has a mole ratio of oxides in the dehydrated state of $$(0.85-1.1)M_{2/n}O:Al_2O_3;xSiO_2$$

wherein M is a cation having a valence of "n"; "x" has a value greater than 6.0 and equal to or less than 9.0, preferably greater than 6.0 and 8.0, has an x-ray powder diffraction pattern having at least the d-spacings of Table A and having extraneous silicon atoms in the crystal lattice in the form of framework $SiO_4$ tetrahedra by the steps of:
(i) thermally treating the aluminosilicate at an effective temperature for an effective time;
(ii) treating the aluminosilicate with a solution of an ammonium salt; and
(iii) treating the aluminosilicate with a solution containing at least one rare earth cation selected from the group consisting of Groups IIA and IIIA, cerium, lanthanum, praseodymium, neodymium, promethium, samarium, europium, gadolinium, terbium, dysprosium, holmium, erbium, thulium, ytterbium, lutetium and mixtures thereof;
(iv) providing an effective amount at least one metal selected from the class consisting of Pt, Pd, Rh, Ru, Ni, W, Mo, Co, Ti, Cr; with the proviso that each of steps (i), (ii), (iii) and (iv) may be carried out in any order for one or more times.

When the classes of LZ-210-T and LZ-210-M are employed such that they are characterized by high molar $SiO_2/Al_2O_3$ ratios and low Defect Structure Factors, then $$\frac{b + (N - \Delta z)}{a - N}$$

preferably has a value greater than 3.0 and less than 4.0 when employed in the instant invention.

The above processes may be carried out in numerous embodiments where the order in which the treatment steps are employed may vary. For example, when the hydrocracking catalyst is derived from LZ-210-T the treatment steps may be combined to provide overall processes including the steps: (i), (ii) and then (iii); (i), and (iii); (ii), (i) and then (iii); (i), (ii), (i) and then (iii); (ii), (i), (ii) and then (iii); and etc. When the hydrocracking catalyst is derived from LZ-210-M the treatment steps may be combined to provide overall processes including the steps: (i), (ii), (iii) and then (iv); (ii), (iii) and then (iv); (ii), (i), (iii) and then (iv); (ii), (i), (ii) and then (iv); (iii), (i), (ii) and then (iv); and (i), (ii), (i) (iii) and then (iv). As above noted, in each of the above processing sequences the ammonium exchange step is optional but is preferably employed.

The final form of the hydrogenation component is not narrowly limited herein but may be a metal oxide or a metal sulfide. Since sulfur is typically present in the hydrocarbon feedstock being treated, the actual form of some of the hydrogenation component(s) may well be a sulfide due to in situ reactions.

The hydrogenation components can be incorporated into the overall catalyst composition by any one of numerous procedures. They can be added either to LZ-210-T and/or LZ-210-M or to the metal oxide or to a combination thereof. In the alternative, multiple hydrogenation components (two or more) are added to the zeolite. They may be added by co-mulling, impregnation, or ion exchange whereby one or more may be added to LZ-210-M or LZ-210-T by impregnation, co-mulling or co-precipitation while the other is similarly added or added by a different procedure. For example, metal compounds such as the sulfides, oxides or water-soluble salts can be added by co-mulling, impregnation or precipitation to either LZ-210-T, LZ-210-M the refractory oxide or the combination thereof before the composite is finally calcined. In the alternative these components can be added to the finished particle by impregnation with an aqueous, alcoholic or hydrocarbon solution of soluble compounds or precursors. Impregnation is the preferred technique when the hydrogenation component is a base metal while ion-exchange techniques are preferred when noble metals are employed as the hydrogenation component.

Although the hydrogenation components can be combined with LZ-210-T and/or LZ-210-M as the sulfides, that is generally not the case. They are usually added as a metal salt which can be thermally converted to the corresponding oxide in an oxidizing atmosphere or reduced to the metal with hydrogen or other reducing agent. The composition can be sulfided by reaction with a sulfur donor such as carbon disulfide, hydrogen sulfide, hydrocarbon thiols, elemental sulfur, and the like, described above. The above oxidizing or sulfiding processes are generally carried out on catalyst compositions which have been partially dried (as desired), tableted, pelleted, extruded (with binder or matrix), or formed by other means and then calcined, e.g., at a temperature above 600° F., usually above 800° F.

It is well known in the art that the hydrocracking catalyst and hydrogenation component are generally employed with a binder material or, as commonly referred to, with an inorganic oxide matrix which can be inert or also catalytically active. For example inorganic matrixes such as silica, silica-alumina, silica-zirconia, silica-magnesia, alumina-borea, alumina-titania and the like and mixtures thereof may be employed. An inorganic oxide need not always be employed or may be employed in an amount as little as about 5% or in an amount as great as 95% by weight, based on the total weight of the hydrocracking composition.

The hydrocracking catalysts LZ-210-T and LZ-210-M may be used in conjunction with molecular sieves such as silicalite (U.S. Pat. No. 4,061,724) or with other aluminosilicates including: natural zeolites such as erionite, mordenite, offretite, chabazite, faujasite, etc; and with synthetic zeolites including: Zeolites X and Y, ZSM-type zeolites (E.G. ZSM-5, ZSM-11, ZSM-12, ZSM-20 and ZSM-21); FU-1-type zeolites, and the like.

The hydrocarbon feedstock to be charged to the hydrocracking unit typically boils above 300° F., preferably between about 350° F. and 1100° F. and more preferably between about 420° F. and about 900° F. The hydrocarbon feed may be derived from many sources including: catalytic cracking processes; coking processes; fractionators from crude oil; hydroprocessing; pryrolysis processes; just to name a few. When operating a hydrocracking process to maximize gasoline production, the typical feedstock currently in commercial use has an end boiling point not greater than about 800° F. Typically, a light catalytic cycle oil, or a light virgin gas oil, or mixtures thereof, boiling in the range of from about 300° F. to 800° F. is employed as a feedstock. The feed may be pre-treated to in a hydrotreater to reduce, i.e. remove, the content of compounds which contain sulfur and/or nitrogen. The feed may have a significant sulfur content, present as hydrogen sulfide, ranging from 0.1 to 3 weight percent, and nitrogen content, present as ammonia, may be present in an amount up to 4000 parts per million (ppm), or more. Temperature, space velocity, and other process variables may be adjusted to compensate for the effects of nitrogen on the hydrocracking catalyst activity.

The feedstock is contacted in the hydrocracking reaction zone with the hydrocracking catalyst in the presence of hydrogen-containing gas. Hydrogen is consumed in the hydrocracking process and an excess of hydrogen is typically maintained in the reaction zone. Advantageously, a hydrogen-to-oil (feed) ratio of at least 1,000 standard cubic feet of hydrogen per barrel of feed (SCFB) is employed, and the hydrogen-to-oil ratio may range up to 20,000 SCFB. Preferably, about 4,000 to 12,000 SCFB is employed.

The hydrocracking reaction zone is typically operated under conditions of elevated temperature and pressure. The total hydrocracking pressure usually is between about 400 and about 4,000 pounds per square inch gauge (psig) and, preferably, between about 500 and 2000 psig. The hydrocracking reaction is exothermic and a temperature rise occurs across the catalyst bed. Therefore, the inlet temperature to the hydrocracking reaction zone may be 10° to 40° F. lower than the exit temperature. The average hydrocracking catalyst bed temperature is between about 450° F. and 800° F. depending on the presence of absence of $NH_3$ and the catalyst's age. The liquid hourly space velocity (LHSV) typically is between 0.2 and 5 volumes of feed per hour per volumes of catalyst, and preferably between 0.25 and 4 LHSV.

The following examples were carried out to demonstrate the improved performance of LZ-210-T and LZ-210-M when employed as hydrocracking catalysts and are provided to illustrate the invention and are not intended to be limiting thereof. LZ-210-T and LZ-210-M were prepared using LZ-210 prepared according to the above-described general procedure using a standard commercially available zeolite Y having an initial $SiO_2$ to $Al_2O_3$ ratio as set in Table II. The $SiO_2$ to $Al_2O_3$ mole ratios of the LZ-210-T or LZ-210-M products were similar to i.e. substantially the same, as the same as the LZ-210 starting material and such values are set forth in Tables I, II and II hereinafter.

PREPARATIVE EXAMPLES

Examples 1 to 20 demonstrate the preparation of LZ-210-T, LZ-210-M and the hydrogenation component-containing LZ-210-T and LZ-210-M. Examples 21 to 27 show the preparation of comparative catalysts.

EXAMPLES 1 TO 20

Examples 1 to 20 set forth the preparations of LZ-210-T and LZ-210-M compositions including such when associated with a hydrogenation component. The catalysts prepared in examples 1 to 20 each involved an ammonium exchange preparative step with either ammonium nitrate or ammonium chloride. The ammonium exchange step was carried out one or more times to reduce the alkali metal content to less than 0.2. Each catalyst was hydrothermally treated (except examples 1, 4, 5 and 12) by use of 100% steam at 600° C. for a period between about 1 and about 2 hours. Examples 1, 4 and 5 employed only 25 percent steam and example 12 employed no steam. The details of Examples 1 to 20 are set forth in Table I.

TABLE I

| Example | Si/Al$_2$[1] | Treatment[2] | M-Cation[3] | Wt % Pd[4] | Wt % Base Metal[4] |
|---|---|---|---|---|---|
| 1[5] | 7.2 | BC | — | 0.55 | — |

TABLE I-continued

| Example | Si/Al$_2$[1] | Treatment[2] | M-Cation[3] | Wt % Pd[4] | Wt % Base Metal[4] |
|---|---|---|---|---|---|
| 2 | 6.2 | BC | — | 0.71 | — |
| 3 | 6.2 | BC | — | 0.55 | — |
| 4[5] | 9.0 | BC | — | 0.55 | — |
| 5 | 9.0 | BC | — | 0.64 | — |
| 6 | 6.5 | ABC | RE(NO$_3$)$_3$ | 0.68 | — |
| 7 | 9.0 | ABC | RE(NO$_3$)$_3$ | 0.64 | — |
| 8 | 6.2 | ABC | RE(NO$_3$)$_3$ | 0.50 | — |
| 9 | 6.5 | ABC | RE(NO$_3$)$_3$ | 0.55 | — |
| 10 | 6.2 | ABC | RE(NO$_3$)$_3$ | 0.81 | — |
| 11[5] | 6.5 | BABC | RE(NO$_3$)$_3$ | 0.61 | — |
| 12 | 6.2 | ADC | RE(NO$_3$)$_3$ | 0.54 | — |
| 13 | 6.2 | BC | — | — | NiO:4.7%; WO$_3$:20.1% |
| 14 | 9.0 | BC | — | — | NiO:4.8%; WO$_3$:20.9% |
| 15 | 6.2 | BC | — | — | NiO:4.7%; M$_o$O$_3$:15.4% |
| 16 | 9.0 | BC | — | — | NiO:4.9%; M$_o$O$_3$:15.8% |
| 17 | 6.2 | ABC | RE(NO$_3$)$_3$ | — | NiO:5.1%; WO$_3$:19.2% |
| 18 | 6.2 | BC | — | — | NiO:4.7%; WO$_3$:20.1% |
| 19 | 6.5 | BABC | RE(NO$_3$)$_3$ | — | NiO:5.0%; WO$_3$:22% |
| 20 | 6.5 | BC | — | — | NiO:4.4%; WO$_3$:19.8% |

[1]SiO$_2$ to Al$_2$O$_3$ ratio.
[2]Sequence of treatment steps as discussed under "Preparation of LZ-210-T and LZ-210-M".
[3]Multivalent cation salt solution was nitrate salt of rare earth (RE) sold as Product Code No. 5247 by Molycorp, Inc.
[4]Weight percent of hydrogenation component in final composition.
[5]The LZ-210 product was washed with a solution of soluble aluminum salt (aluminum sulfate or aluminum chloride) prior to use to remove excess residual fluoride instead of the standard wash with water.

EXAMPLES 21 TO 27

Examples 21–22, and 24–27 and are preparative examples for comparative catalysts. Example 23 is provided for comparison and is a catalyst prepared in accordance with the instant invention. The ammonium exchange was as that employed in examples 1 to 20. The details of Examples 21 to 27 are set forth in Table II.

Example 25 was prepared with an LZ-210 having a SiO$_2$ to Al$_2$O$_3$ ratio of 7.4; it was the LZ-210 slurried with a ten percent by weight aqueous ammonium chloride solution by employing one part by weight of the LZ-210 and 10 parts by weight of the ammonium chloride solution. The resulting slurry was then refluxed for one hour. The resulting mixture was decanted and the product washed to remove substantially all chloride. This procedure was then repeated two more times. A hydrogenation component was added to the above ammonium-exchanged LZ-210 by slowly mixing (over about 1 hour) 6.3 milliliters of an aqueous solution of palladium ethylene diamine dichloride containing 0.025 grams of palladium per milliliter of solution, with a slurry of 229 grams of the LZ-210 (1 gram of LZ-210 per 10 milliliters of water). The mixture was stirred for about one hour and filtered and water washed. The final product contained about 0.68 weight percent palladium.

TABLE II

| Example | Si/Al$_2$[1] | Treatment[2] | Thermal[3] | Wt% Pd[4] | Wt% Base Metal[4] |
|---|---|---|---|---|---|
| 21[5] | 8.3 | BC | 25%(600° C.) | 0.68 | — |
| 22[6] | 8.7 | CD | — | 0.68 | — |
| 23[7] | 6.2 | BC | 100%(600° C.) | 0.68 | — |
| 24[8] | 9.6 | — | — | 0.53 | — |
| 25[9] | 7.4 | C | 600° C. | 0.54 | — |
| 26[10] | 4.9 | CBC | 100%(600° C.) | 0.54 | — |
| 27[11] | 5.2 | CBC | 100%(600° C.) | — | NiO:5.0%; Mo$_2$O$_3$:15.0% |

[1]SiO$_2$ to Al$_2$O$_3$ ratio of aluminosilicate. Examples 23, 24 and 25 are derived from LZ-210 zeolites. Examples 21, 22, 26 and 27 are zeolites as described in footnotes 5 to 11.
[2]Sequence of treatment steps as discussed under "CATALYSTS LZ-210-T and LZ-210-M
[3]Thermal treatment with weight percent steam, if any, and temperature indicated. The thermal treatment was typically carried out for a period between about 1 and about 2 hours
[4]Weight percent of hydrogenation component in final composition, based on the total final weight.
[5]Y-zeolite prepared according to U.S. Pat. No. 3,442,795 by use of HCl/EDTA treatment
[6]Y-zeolite perpared by acid treating a Y zeolite.
[7]Example 23 is a not comparative example and is provied herein for convenient comparison with comparative examples 20 to 22 and 24 to 27.
[8]Prepared as in Example 22 of copending U.S. Ser. No. 315,853, filed October 28,1981.
[9]Ammonium exchanged LZ-210 without thermal treatment and without ion exchange with a multivalent cation.
[10]Prepared from a thermally stabilized Y zeolite which is a commercially available catalyst. Example 26 is a reference catalyst (Y-zeolite) with a noble metal hydrogenation component.
[11]Commercially available Y-zeolite which has been ammonium-exchanged. Example 27 is a reference catalyst with a base metal hydrogenation component.

EXAMPLES 28 TO 37

Examples 28 to 33 were carried out to determine the activity of a selected catalyst in both a first-stage and second stage hydrocracking process.

LZ-210-T and LZ-210-M were prepared as above described and tested for their utility as hydrocracking catalysts by employing such as hydrocracking catalysts in both first stage and second stage hydrocracking processes. The characteristic differences of first stage vs. second stage hydrocracking have been previously discussed. When a noble metal is employed as the hydrogenation component it is typically carefully reduced in a hydrogen atmosphere and when the hydrogenation component is a base metal it is typically treated with a sulfur compound.

A selected catalyst was evaluated by either one of two procedures. For convenient reference herein these procedures are referred to as "Procedure PA" and Procedure PB and are as follows:

Procedure PA comprised contacting the hydrocarbon feed (boiling between about 383° F. and about 732° F. (ASTM D-1160) with the selected catalyst. The first stage testing included adding 0.5 weight percent sulfur in the form of thiophene and 0.2 weight percent nitrogen in the form of t-butylamine to the feedstock. The second stage testing included the addition of 0.5 weight percent sulfur in the form of thiophene to the feedstock. In both cases the weight percents were based on the total weight of the feedstock. The hydrocracking process (first stage, second stage) was carried out at a pressure between about 1450 psig and about 1500 psig and at a LHSV (liquid hourly space velocity) of about 1.7. Hydrogen was introduced at a rate of about 8000 SCFB of feed (Standard Cubic feet per barrel of feedstock).

The performance of a given catalyst was evaluated by determining the activity temperature that a selected catalyst required to yield a product with a given API gravity after 100 hours of operation as a hydrocracking catalyst. For the first stage tests the API was 47° API gravity and for the second stage it was selected as 49.5° API gravity for determining the catalysts activity temperature. A comparative catalyst (reference catalyst) comprising a commercially available Y zeolite was employed to provide for a comparison of LZ-210-T and LZ-210-M. The difference between the activity temperature of the reference catalyst and a given catalyst was expressed as a delta-value, i.e. the difference between the activity temperatures as compared against the reference catalyst. A positive delta-value indicates the catalyst had decreased activity while a negative value indicated that the catalyst had increased activity. When a selected catalyst was tested for both first and second stage activity the second stage activity was carried out first to avoid poisoning the catalyst with the NH$_3$ via hydrocracking of the nitrogen compound.

When a "delta value" is given for a given catalyst the value has been computed by comparison to a reference catalyst as prepared in examples 27 or 26, depending on whether the hydrogenation component is a noble metal or base metal. The "delta value" for each catalyst is measured by a comparison of the catalyst and the relevant reference catalyst wherein both are evaluated under similar process conditions and in the same experimental apparatus. Thus, the comparison with the reference catalyst is carried out at the same process conditions as the catalyst with which it is compared to obtain the delta value but these process conditions are not the same each time the reference catalyst is compared with a selected catalyst, such process conditions being similar to those employed for the catalyst being compared.

The "delta" value for a given catalyst is a commercially significant value since the overall kinetics of a hydrocracking process involves deactivation of the catalyst with time which requires the constant incremental increase in the operating temperature of the process as a function of time to maintain constant conversion of the hydrocarbon feedstock. The process equipment necessarily has temperature constraints such that when the process reaches a designated temperature the process must be shutdown, i.e., terminated, and the catalyst changed. Since these shutdowns are quite costly, a catalyst which provides the desired conversion at a lower temperature (as indicated by a negative delta) has a longer life in the hydrocracking process since it requires a longer time to achieve the shutdown temperature. For example, the typical temperature increment for a commercial hydrocracking process is on the order of 0.05 to 0.1 degrees per day of operation and a catalyst which has a negative delta of 10 can provide from 100 to 200 additional days of plant operation before catalyst changeover.

Procedure PB comprised a procedure which generated sufficient data for a plot of temperature vs. conversion for a selected catalyst to provide for comparisons between various catalysts at a given conversion. Procedure PB involved adjustment of the reactor temperature during a catalyst's evaluation to provide product's which had API gravities of 47°, 48.5°, 50° and 51.5°. Material balances and simulated distillations (ASTM D-2887) were carried out for each of these products. The resulting temperature vs. conversion plot was employed to make comparisons with respect to the activities of various catalysts at a selected conversion level.

The hydrocracking experiments (both Procedures PA and PB) were carried out by introducing a selected feedstock to a stainless steel reactor having an axial thermowell. The temperature in the reactor was monitored by thermocouple in the thermowell. The catalyst was in the form of extrudates (80 or 85 parts by weight zeolitic component to, respectively, 20 or 15 parts by weight alumina) and was placed in the reactor and mixed with quartz chips to minimize reactor hot spots.

The present examples and examples hereinafter employ two feedstocks. The feedstocks are referred to herein for convenience as Feedstocks I and II. Feedstocks I and II are characterized by the following physical characteristics:

|  | FEEDSTOCK | |
|---|---|---|
|  | I | II |
| Boiling Range (ASTM D-1160)°F. (Volume Percent) | | |
| IBP | 316 | 383 |
| 5 | 404 | 402 |
| 10 | 412 | 410 |
| 50 | 495 | 508 |
| 90 | 687 | 692 |
| 95 | 720 | 727 |
| EP | 789 | 732 |
| COMPOSITION (VOLUME %) | | |
| Total Aromatics | 21.4 | 27.3 |
| Mono Aromatics | 20.1 | 23.9 |
| Diaromatics | 0.3 | 0.3 |
| Triaromatics | 1.0 | 2.1 |
| Tetraaromatics | 0 | 0.5 |
| Pentaaromatics | 0 | 0.5 |
| Total Olefins | 0 | 0 |
| Total Saturates | 77.9 | 72.8 |

The improvement in second stage performance for LZ-210-T based catalysts is readily seen by reference to the negative delta values in Table III wherein Procedure PA was employed to evaluate the zeolites. In addition, comparisons with several other dealuminated Y-based catalysts were carried out as indicated by the zeolites employed to prepare the catalyst.

TABLE III

| EXAMPLE | CATALYST (Example Prepared) | SECOND STAGE[1] (°F.) | DELTA,°F. | FIRST STAGE[1] (°F) | DELTA,°F. | FEED[2] |
|---|---|---|---|---|---|---|
| 28 | 1 | 500 | +10 | 670 | −10 | II |
| 29 | 2 | 498 | −10 | 692 | −6 | I |
| 30 | 3 | 502 | −6 | 693 | −4 | I |
| 31 | 4 | 523 | +16 | — | — | I |
| 32 | 5 | — | — | 691 | −6 | I |
| 33 | 10 | 491 | −19 | 687 | −10 | II |
| 34 | 22 | 552 | +57 | 715 | +30 | II |
| 35 | 12 | 493 | −17 | 701 | +9 | I |
| 36 | 11 | | +9 | | | I |
| 37 | 25 | 499 | +9 | 703 | +20 | I |
| 38 | 26 | — | 0 | — | 0 | II |
| 38a | 21 | 504 | +9 | 688 | +3 | II |

[1]The temperature (°F.) is the temperature required to achieve an API gravity of 49.5° and 47°, respectively, in second and first stage hydrocracking. The "delta" value is then calculated.
[2]Hydrocarbon Feedstock

EXAMPLES 39 TO 47

Examples 39 to 47 were carried out according to the experimental procedure described for examples 28 to 38 employing catalysts using the zeolites prepared in examples 13 to 20 and 27 as shown in Table IV. The catalyst was an extrudate formed from a mixture of 60 parts by weight of the zeolitic component and 20 parts by weight alumina. The results in Table IV show that LZ-210-T exhibited improved single-stage performance when associated with a base metal hydrogenation component (typically employed in single-stage processes) relative to a commercial base metal catalyst using a zeolite Y base (Example 27).

TABLE IV

| EXAMPLE | CATALYST (Example Prepared) | FIRST STAGE[1] (°F.) | DELTA, °F. | PROCEDURE[2] | FEED[3] |
|---|---|---|---|---|---|
| 39 | 13 | 711 | −11 | PB | II |
| 40 | 14 | 706 | −16 | PB | II |
| 41 | 15 | 715 | −4 | PA | II |
| 42 | 16 | 708 | −11 | PA | II |
| 43 | 17 | 715 | −7 | PB | II |
| 44 | 18 | 711 | −11 | PB | II |
| 45 | 19 | 707 | −12 | PA | II |
| 46 | 20 | 710 | −9 | PA | II |
| 47 | 27 | 719 | 0 | PA | II |

[1]Delta values were evaluated in comparison to the typical commercial catalyst as prepared in Ex. 27 and employed in Ex. 47.
[2]Procedure PA or Procedure PB
[3]Hydrocarbon Feedstock

EXAMPLES 48 AND 49

Examples 48 and 49 were carried out according to the Experimental procedure PA using Feedstock II using the catalysts shown in Table V. The rejuvenability of each catalyst was evaluated by carrying out a rejuvenation process involving an ammonia rejuvenation process comprising refluxing the catalyst with an aqueous solution of an ammonia solution at about a temperature greater than about 50° C. for the reflux period. The catalysts were given a simulated aging treatment in steam at about 550° C. for about 1 hour prior to the rejuvenation procedure. The solution was then decanted, and the product washed with distilled water and dried at 100° C. The dried catalyst was then calcined (500° C. for about 1 hour). The rejuvenated catalysts were then evaluated by the procedure employed for the non-rejuvenated catalysts. Examples 48 shows that LZ-210-M exhibit improved performance both before and after rejuvenation. Example 48 shows the performance of LZ-210-M and should be compared with the Examples 49.

TABLE V

| EXAMPLE | Catalyst (Example Proposed) | Non-Rejuvenated[1] 2nd Stage Delta, °F. | Non-Rejuvenated[1] 1st Stage Delta, °F. | Rejuvenated[1] 2nd Stage Delta, °F. | Rejuvenated[1] 1st Stage Delta, °F. |
|---|---|---|---|---|---|
| 48 | 10 | −19 | −10 | −21 | −7 |
| 49 | 26 | 0 | 0 | +22 | +25 |

[1]The first and second stage delta values compared against the non-rejuvenated reference catalyst of example 26
"Non-rejuvenated" means the zeolite was tested after preparation as set forth in the preparative examples 10 and 26 without the ammonia treatment.

EXAMPLES 50 TO 52

Examples 50 to 52 were carried out to evaluate the hydrothermal stability of: (1) an acid washed zeolite Y; (2) an EDTA extracted zeolite Y; and (3) LZ-210, respectively. The zeolites were ammonium exchanged to provide zeolites with similar $Na_2O$ contents. Each zeolite was steam deactivated by placing the zeolites in a hot furnace (873° C.±4° C.) in the presence of 23%±2% by volume steam in air for five hours. The zeolites were then hydrated at room temperature (18° C. to 22° C.) for at least 48 hours. The percent oxygen retention, present surface retention and percent X-ray retention (XRD) were measured by the procedure described in U.S. Ser. No. 315,853 for each zeolite with a higher over all retention, indicating the zeolite would be expected to be more stable towards the hydrothermal conditions found in catalytic cracking processes, accordingly, and have a longer catalyst life. The "Average Retention" values in Table VII show that LZ-210 has a higher average retention, and accordingly should exhibit improved catalyst life.

TABLE VII[1]

| Example | 50 | 51 | 52 |
|---|---|---|---|
| $SiO_2/Al_2O_3$ | 8.8 | 8.1 | 8.4 |
| % $O_2$ Retention[2] | 49.2 | 26.0 | 47.9 |
| % Surface Area Retention[2] | 45.9 | 19.4 | 46.6 |
| % XRD Retention[2] | 54.2 | 19.3 | 57.9 |
| Average Retention | 49.8 | 21.6 | 50.8 |

[1]Crystal retention after steaming in 23% steam at 870° C. for 17 hours.
[2]Carried out according to procedure of U.S. Ser. No. 315,853 as hereinbefore referenced.

What is claimed is:

1. The process for the preparation of a hydrocracking catalyst comprising treating a zeolitic aluminosilicate which has a mole ratio of oxides in the anhydrous state of (0.85–1.1) $M_{2/n}O:Al_2O_3$; $xSiO_2$ wherein M is a cation having a valence of "n"; "x" has a value greater than 6.0 and equal to or less than 9.0, has an x-ray powder diffraction pattern having at least the d-spacings of Table A and has extraneous silicon atoms in the crystal lattice in the form of framework $SiO_4$ tetrahedra comprising:

(a) treating the aluminosilicate by at least one of the following steps: (i) thermally treating the aluminosilicate at an effective temperature for an effective time; and (ii) treating the aluminosilicate with a solution containing at least one rare earth cation selected from the group consisting of Groups IIA and IIIA, cerium, lanthanum, praseodymium, neodymium, promethium, samarium, europium, gadolinium, terbium, dysprosium, holmium, erbium, thulium, ytterbium, lutetium and mixtures thereof; with the proviso that each of the above steps may be carried out in any order for one or more times; and (b) providing an effective amount of at least one metal selected from the class consisting of Pt, Pd, Rh, Ru, Ni, W, Mo, Co, Ti, Cr and mixtures thereof.

2. The process of claim 1 for the preparation of a hydrocracking catalyst comprising the treatment of a zeolitic aluminosilicate which has a mole ratio of oxides in the dehydrated state of (0.85–1.1) $M_{2/n}O:Al_2O_3$; $xSiO_2$ wherein M is a cation having a valence of "n"; "x" has a value greater than 6.0 and equal to or less than 9.0, has an x-ray powder diffraction pattern having at least the d-spacings of Table A and having extraneous silicon atoms in the crystal lattice in the form of framework $SiO_4$ tetrahedra by the steps of:

(i) thermally treating the aluminosilicate at an effective temperature for an effective time;

(ii) providing an effective amount of at least one metal selected from the class consisting of Pt, Pd, Rh, Ru, Ni, W, Mo, Co, Ti and Cr to the product of step (i) and (ii) to provide a hydrocracking catalyst; with the proviso that each of steps (i)

(ii) and (iii) may be carried out in any order for one or more times.

3. The process of claim 1 wherein the steps comprise in any order:

(i) thermally treating the aluminosilicate at an effective temperature for an effective time;

(ii) treating the aluminosilicate with a solution of an ammonium salt;

(iii) treating the aluminosilicate with a solution containing at least one multi-valent cation selected from the group consisting of Groups IIA and IIIA, cerium, lanthanum, praseodymium, neodymium, promethium, samarium, europium, gadolinium, terbium, dysprosium, holmium, erbium, thulium, ytterbium, lutetium and mixtures thereof;

(iv) providing an effective amount of at least one metal selected from the class consisting of Pt, Pd, Rh, Ru, Ni, W, Mo, Co, Ti and Cr; with the proviso that each of steps (i), (ii), (iii) and (iv) may be carried out in any order for one or more times.

4. The process of claim 2 wherein "x" has a value greater than 6.0 and less than 8.0.

5. The process of claim 3 wherein "x" has a value greater than 6.0 and less than 8.0.

6. The process of claim 2 wherein the process is carried out by carrying out the steps in the order of (i), (ii) and then (iii).

7. The process of claim 2 wherein the process is carried out by carrying out the steps in the order (ii), (i) and then (iii).

8. The process of claim 2 wherein the process is carried out by carrying out the steps in the order (i), (ii), (iii) and then (iv).

9. The process of claim 3 wherein the process is carried out by carrying out the steps in the order (ii), (i), (iii) and then (iv).

10. The process of claim 3 wherein the process is carried out by carrying out the steps in the order (ii), (i), (ii) and then (iv).

11. The process of claim 3 wherein the process is carried out by carrying out the steps in the order (iii), (i), (ii) and then (iv).

12. The process of claim 2 wherein the effective temperature is greater than 300° C.

13. The process of claim 12 wherein the effective temperature is greater than 500° C.

14. The process of claim 3 wherein the effective temperature is greater than 300° C.

15. The process of claim 14 wherein the effective temperature is greater than 500° C.

16. The process of claim 2 wherein step (i) is carried out in the presence of steam.

17. The process of claim 16 wherein said steam is present in air in an amount of at least 20 percent by volume.

18. The process of claim 17 wherein said steam is present in air in an amount of at least 50 percent by volume.

19. The process of claim 3 wherein step (i) is carried out in the presence of steam.

20. The process of claim 19 wherein said steam is present in air in an amount of at least 20 percent by volume.

21. The process of claim 20 wherein said steam is present in air at least 50 percent.

22. The process of claim 2 wherein the effective time in step (i) is greater than 0.1 hour.

23. The process of claim 22 wherein the effective time in step (i) is between 0.1 hour and about 10 hours.

24. The process of claim 3 wherein the effective time in step (i) is greater than 0.1 hour.

25. The process of claim 24 wherein the effective time in step (i) is between 0.1 hour and about 10 hours.

26. The process of claim 2 wherein step (i) is carried out in the presence of at least 50 percent by volume steam in air at a temperature above 400° C. for a period of at least 0.25 hour.

27. The process of claim 3 wherein step (i) is carried out in the presence of at least 50 percent by volume steam in air at a temperature above 400° C. for a period of at least 0.25 hour.

28. The process of claim 2 wherein the zeolitic aluminosilicate is defined as having a chemical composition expressed in terms of mole fractions of framework tetrahedra as:

$$[Al_{(a-N)}Si_{b+(N-\Delta z)}\square_z]O_2$$

wherein;

$$\frac{b + (N - \Delta z)}{a - N}$$

has a value greater than 3 and equal to or less than 4.5; the change in defect structure factor $\Delta z$ is less than 0.08; an increased silicon content in the framework, $$\frac{(N - \Delta z)}{N}$$

of at least 0.5; and a cation equivalent expressed as a monovalent cation species, $M^+/Al$, from 0.85 to 1.1 and the characteristic crystal structure of zeolite Y as indicated by an X-ray powder diffraction pattern having at least the d-spacings set forth broadly in Table A.

29. The process of claim 28 wherein the change in defect structure $\Delta z$ is less than 0.05.

30. The process of claim 28 wherein $$\frac{(b + N - \Delta z)}{a - N}$$

has a value greater than 3.0 and less than 4.0.

31. The process of claim 3 wherein the zeolitic aluminosilicate is defined as having a chemical composition expressed in terms of mole fractions of framework tetrahedra as:

$$[Al_{(a-N)}Si_{b+(N-z)}\square_z]O_2$$

wherein $$\frac{b + N - \Delta z}{a - N}$$

has a value greater than 3 and equal to or less than 4.5; the change in defect structure factor $\Delta z$ is less than 0.08; an increased silicon content in the framework, $$\frac{N - \Delta z}{N},$$

of at least 0.5; and a cation equivalent expressed as a monovalent cation species, $M^{+/Al}$, from 0.85 to 1.1 and the characteristic crystal structure of zeolite Y as indicated by an X-ray powder diffraction pattern having at least the d-spacings set forth broadly in Table A.

32. The process of claim 31 wherein the change in defect structure $\Delta z$ is less than 0.05.

33. The process of claim 31 wherein $$\frac{b + (N - \Delta z)}{a - N}$$

has a value greater than 3.0 and less than 4.0.

34. The hydrocracking catalyst prepared by the process of claim 2.

35. The hydrocracking catalyst prepared by the process of claim 3.

36. The hydrocracking catalyst prepared by the process of claim 6.

37. The hydrocracking catalyst prepared by the process of claim 6.

38. The hydrocracking catalyst prepared by the process of claim 7.

39. The hydrocracking catalyst prepared by the process of claim 9.

40. The hydrocracking catalyst prepared by the process of claim 10.

41. The hydrocracking catalyst prepared by the process of claim 11.

42. The hydrocracking catalyst comprising a zeolitic aluminosilicate having a mole ratio of oxides in the dehydrated state of $$(0.85-1.1)M_{2/n}O:Al_2O_3:xSiO_2$$

wherein M is a cation having a valence of "n"; "x" has a value greater than 6.0 and equal to or less than 9.0; has an x-ray powder diffraction pattern having at least the d-spacings of Table A; has extraneous silicon atoms in the crystal lattice in the form of framework $SiO_4$ tetrahedra; wherein said zeolitic aluminosilicate has between about 5 ion-exchange percent and about 80 ion-exchange percent of the cations selected from the group consisting of Groups IIA, IIIA, cerium, lanthanum, praseodymium, neodymium, promethium, samarium, europium, gadolinium, terbium, dysprosium, holmium, erbium, thulium, ytterbium, lutetium and mixtures thereof, and between 0.05 and 30 percent by weight of at least one metal selected from the group consisting of Pt, Pd, Rh, Ru, Ni, W, Mo, Co, Ti, Cr and mixtures thereof.

43. The hydrocracking catalyst of claim 40 wherein the value of "x" is greater than 6.0 and less than 8.0.

44. The hydrocracking catalyst of claim 42 wherein the zeolitic aluminosilicate is defined as having a chemical composition expressed in terms of mole fractions of framework tetrahedra as:

$$[Al_{(a-N)}Si_{b+(N-\Delta z)}\square_z]O_2$$

wherein;

$$\frac{b + (N - \Delta z)}{a - N}$$

has a value greater than 3.0 and equal to or less than 9.0; the change in defect structure factor $\Delta z$ is less than 0.08; an increased silicon content in the framework, $$\frac{(N - \Delta z)}{N},$$

of at least 0.5; and a cation equivalent expressed as a monovalent cation species, $M^+/Al$, from 0.85 to 1.1 and the characteristic crystal structure of zeolite Y as indicated by an X-ray powder diffraction pattern having at least the d-spacings set forth broadly in Table A.

45. The hydrocracking catalyst of claim 43 wherein the change in defect structure $\Delta z$ is less than 0.05.

46. The hydrocracking catalyst of claim 43 wherein $$\frac{b + (N - \Delta z)}{a - N}$$

has a value greater than 3.0 and less than 4.0.

47. The hydrocracking catalyst of claim 42 wherein the metal is selected from the group consisting of Pt, Pd, Rh, Ru and mixtures thereof and is present in an amount between 0.05 and 1.5 percent by weight.

48. The hydrocracking catalyst of claim 42 wherein the metal is selected from the group consisting of Ni, W, Mo, Co, Ti, Cr and mixtures thereof and is present in an amount between 0.5 and 30 percent by weight.

49. A process for preparing a hydrocarbon conversion catalyst for conversion of a hydrocarbon feedstock under effective hydrocracking conditions in the presence of hydrogen to produce lower boiling hydrocarbons wherein the process comprises:
(a) treating with an effective amount of at least one rare earth cation, a zeolitic aluminosilicate which has a mole ratio of oxides in the anhydrous state of $$(0.85-1.1)M_{2/n}O:Al_2O_3:xSiO_2$$

wherein M is a cation having a valence of "n"; "x" has a value greater than 6.0 and equal to or less than 9.0, has an X-ray powder diffraction pattern having at least the d-spacings of Table A and has extraneous silicon atoms in the crystal lattice in the form of framework $SiO_4$ tetrahedra;
(b) thermally treating the product of step (a) at an effective temperature in the presence of an effective amount of steam;
(c) ammonium-exchanging the product of step (b); and
(d) providing the product of step (c) with an effective amount of at least one hydrogenation component selected from the group consisting of Pt, Pd, Rh, and Ru.

50. The process of claim 49 wherein the aluminosilicate of step (a) is prepared by inserting silicon atoms as $SiO_4$ tetrahedra into the crystal lattice of said aluminosilicate zeolite by contacting a crystalline Y zeolite aluminosilicate having a $SiO_2/Al_2O_3$ molar ratio of at least 3 and pore diameters of at least 3 Angstroms with a fluorosilicate salt in an amount of at least 0.0075 moles per 100 grams of the zeolite aluminosilicate on an anhydrous basis, said fluorosilicate salt being in the form of an aqueous solution having a pH value within the range of 3 to 7 and brought into contact with the Y zeolite aluminosilicate at a rate sufficiently slow to preserve at least 80 percent of the crystallinity of the starting Y zeolite aluminosilicate.

51. Process according to claim 50 wherein the starting crystalline Y zeolite aluminosilicate is at least partially in the ammonium cationic form.

52. Process according to claim 51 wherein the fluorosilicate salt is ammonium fluorosilicate.

53. Process according to claim 49 for preparing a hydrocarbon conversion catalyst for conversion of a hydrocarbon feedstock under effective hydrocracking conditions in the presence of hydrogen to produce lower boiling hydrocarbons wherein the process comprises:
(a) treating with an effective amount of at least one rare earth cation in an amount between about 5 ion-exchange percent and about 80 ion-exchange percent, a zeolitic aluminosilicate which has a mole ratio of oxides in the anhydrous state of $$(0.85-1.1)M_{2/n}O:Al_2O_3:xSiO_2$$

wherein M is a cation having a valence of "n"; "x" has a value greater than 6.0 and equal to or less than 9.0, has an X-ray powder diffraction pattern having at least the d-spacings of Table A and has extraneous silicon atoms in the crystal lattice in the form of framework $SiO_4$ tetrahedra;
(b) thermally treating the product of step (a) at an effective temperature greater than 300° C. in the presence of an effective amount of steam in an amount of at least 20 percent by volume;
(c) ammonium-exchanging the product of step (b); and
(d) providing the product of step (c) with an effective amount between about 0.05 and about 30 percent by weight of at least one hydrogenation component selected from the group consisting of Pt, Pd, Rh, and Ru.

54. A hydrocracking catalyst for the conversion of a hydrocarbon feedstock under effective hydrocracking conditions in the presence of hydrogen to produce lower boiling hydrocarbons which is prepared by the following steps:
(a) treating with an effective amount of at least one rare earth cation, a zeolitic aluminosilicate which has a mole ratio of oxides in the anhydrous state of $$(0.85-1.1)M_{2/n}O:Al_2O_3:xSiO_2$$

wherein M is a cation having a valence of "n"; "x" has a value greater than 6.0 and equal to or less than 9.0, has an X-ray powder diffraction pattern having at least the d-spacings of Table A and has extraneous silicon atoms in the crystal lattice in the form of framework $SiO_4$ tetrahedra;
(b) thermally treating the product of step (a) at an effective temperature in the presence of an effective amount of steam;
(c) ammonium-exchanging the product of step (b); and
(d) providing the product of step (c) with an effective amount of at least one hydrogenation component selected from the group consisting of Pt, Pd, Rh, and Ru.

55. The hydrocracking catalyst of claim 53 wherein the aluminosilicate of step (a) is prepared by inserting silicon atoms as $SiO_4$ tetrahedra into the crystal lattice of said aluminosilicate zeolite by contacting a crystalline Y zeolite aluminosilicate having a $SiO_2/Al_2O_3$ molar ratio of at least 3 and pore diameters of at least 3 Angstroms with a fluorosilicate salt in an amount of at least 0.0075 moles per 100 grams of the zeolitic aluminosilicate on an anhydrous basis, said fluorosilicate salt being in the form of an aqueous solution having a pH value within the range of 3 to 7 and brought into contact with the Y zeolite aluminosilicate at a rate sufficiently slow to preserve at least 80 percent of the crystallinity of the starting Y zeolite aluminosilicate.

56. The hydrocracking catalyst of claim 55 wherein the starting crystalline Y zeolite aluminosilicate is at least partially in the ammonium cationic form.

57. The hydrocracking catalyst of claim 56 wherein the fluorosilicate salt is ammonium fluorosilicate.

58. A hydrocracking catalyst according to claim 54 for the conversion of a hydrocarbon feedstock under effective hydrocracking conditions in the presence of hydrogen to produce lower boiling hydrocarbons wherein said catalyst is prepared by the process comprising:
(a) treating with an effective amount of at least one rare earth cation in an amount between about 5 ion-exchange percent and about 80 ion-exchange percent, a zeolitic aluminosilicate which has a mole ratio of oxides in the anhydrous state of $$(0.85-1.1)M_{2/n}O:Al_2O_3:xSiO_2$$

wherein M is a cation having a valence of "n"; "x" has a value greater than 6.0 and equal to or less than 9.0, has an X-ray powder diffraction pattern having at least the d-spacings of Table A and has extraneous silicon atoms in the crystal lattice in the form of framework $SiO_4$ tetrahedra;

(b) thermally treating the product of step (a) at an effective temperature greater than 300° C. in the presence of an effective amount of steam in an amount of at least 20 percent by volume;

(c) ammonium-exchanging the product of step (b); and (d) providing the product of step (c) with an effective amount between about 0.05 and about 30 percent by weight of at least one hydrogenation component selected from the group consisting of Pt, Pd, Rh, and Ru.

* * * * *